(12) United States Patent
Nagayama et al.

(10) Patent No.: US 8,875,860 B2
(45) Date of Patent: Nov. 4, 2014

(54) TORQUE LIMITER

(71) Applicant: JTEKT Corporation, Osaka (JP)

(72) Inventors: Akihide Nagayama, Kashiba (JP);
Nobuo Komeyama, Kitakatsuragi (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 0 days.

(21) Appl. No.: 13/858,510

(22) Filed: Apr. 8, 2013

(65) Prior Publication Data

US 2013/0225301 A1 Aug. 29, 2013

Related U.S. Application Data

(62) Division of application No. 12/735,337, filed as application No. PCT/JP2009/050074 on Jan. 7, 2009, now Pat. No. 8,419,552.

(30) Foreign Application Priority Data

Jan. 8, 2008 (JP) ................................. 2008-001224

(51) Int. Cl.
*F16D 7/02* (2006.01)
*F16D 1/08* (2006.01)
*F16D 9/06* (2006.01)

(52) U.S. Cl.
CPC ................ *F01D 3/80* (2013.01); *F16D 1/0805* (2013.01); *F16D 9/06* (2013.01); *F16D 7/021* (2013.01)
USPC ............. 192/56.3; 192/56.5; 464/30; 464/32; 403/5; 403/31

(58) Field of Classification Search
USPC ................ 464/30, 32; 192/56.3, 56.5, 85.12; 403/31, 36, 39, 5
See application file for complete search history.

(56) References Cited

U.S. PATENT DOCUMENTS

| 4,264,229 A | * | 4/1981 | Falk et al. | 403/5 |
|---|---|---|---|---|
| 4,705,421 A | * | 11/1987 | Depping | 403/2 |
| 4,752,275 A | | 6/1988 | Lindenthal et al. | |
| 5,051,018 A | | 9/1991 | Appell et al. | |
| 6,761,256 B2 | | 7/2004 | Falk | |

(Continued)

FOREIGN PATENT DOCUMENTS

| CN | 1715697 A | 1/2006 |
|---|---|---|
| CN | 1789743 A | 6/2006 |

(Continued)

OTHER PUBLICATIONS

European Search Report dated Nov. 30, 2011.

(Continued)

*Primary Examiner* — Gregory Binda
(74) *Attorney, Agent, or Firm* — McGinn IP Law Group, PLLC

(57) ABSTRACT

A torque limiter includes a shaft member, and a cylindrical member which is fitted rotatably on the shaft member. When the cylindrical member is rotated relative to the shaft member in such a state that the cap member is not screwed in the threaded hole and in such a state that the oil release passage is not opened to the outside, the other end portion of the oil release passage circumferentially moves within the circumferentially extended groove while being spaced apart from the circumferentially extended groove.

8 Claims, 6 Drawing Sheets

(56) References Cited

U.S. PATENT DOCUMENTS

| | | | |
|---|---|---|---|
| 7,025,185 B2 | 4/2006 | Nagayama et al. | |
| 7,090,060 B1 | 8/2006 | Whitney | |
| 8,220,609 B2 | 7/2012 | Ootsuka et al. | |
| 8,424,663 B2 * | 4/2013 | Nagayama et al. | 464/30 X |

FOREIGN PATENT DOCUMENTS

| | | |
|---|---|---|
| DE | 35 45 651 A1 | 7/1987 |
| DE | 41 12 484 A1 | 10/1992 |
| GB | 2 023 250 A | 12/1979 |
| JP | 62-159815 | 7/1987 |
| JP | 6-10631 | 2/1994 |
| JP | 6-37609 | 5/1994 |
| JP | 7-310753 | 11/1995 |
| JP | 2004-211794 | 7/2004 |
| WO | WO 2005/061916 A1 | 7/2005 |

OTHER PUBLICATIONS

Chinese Office Action dated Jul. 27, 2012, with English-language translation.

European Search Report dated Jan. 23, 2012.

* cited by examiner

TORQUE LIMITER

RELATED APPLICATIONS

The present Application is a Divisional Application of U.S. patent application Ser. No. 12/735,337, now U.S. Pat. No. 8,419,552, which was filed on Jul. 7, 2010, which was the National Stage of International Application No. PCT/JP2009/050074 filed on Jan. 7, 2009, the disclosures of each of which are incorporated herein by reference.

The present disclosure relates to the subject matter contained in PCT/JP2009/050074 filed on Jan. 7, 2009 and Japanese Patent Application No. 2008-001224 filed on Jan. 8, 2008, which are incorporated herein by reference in their entirety.

TECHNICAL FIELD

The present invention relates to a torque limiter.

Conventionally, as a torque limiter, there has been a torque limiter that is described in JP-UM-A-6-37609 (Patent Document 1). In this torque limiter, an inner circumferential surface of a cylindrical member is fitted on an outer circumferential surface of a shaft member. Hydraulic oil is supplied into an oil pressure expansion chamber in the cylindrical member, and the inner circumferential surface of the cylindrical member is reduced in diameter by the hydraulic oil so that the inner circumferential surface is pressed against the outer circumferential surface of the shaft member, whereby the shaft member and the cylindrical member are brought into frictional connection with each other for transmission of torque. In this torque limiter, a locking member of the shaft member is locked at the other end portion of an oil release passage which communicates with the oil pressure expansion chamber at one end thereof.

When the shaft member changes its position relative to the cylindrical member about an axis due to the inner circumferential surface of the cylindrical member slipping on the outer circumferential surface of the shaft member as a result of a load of a predetermined value or larger being exerted on the shaft member or the cylindrical member, the other end portion of the oil release passage is broken by the locking member so that the hydraulic oil in the oil pressure expansion chamber is allowed to be discharged to the outside. By doing this, the inner circumferential surface of the cylindrical member is released from the pressurized contact with the outer circumferential surface of the shaft member, which cancels the frictional contact between the shaft member and the cylindrical member to cut off the transmission of torque.

In the conventional torque limiter described above, in assembling the torque limiter, when the cylindrical member rotates relative to the shaft member by the time a predetermined oil pressure is attained in the oil pressure expansion chamber, the other end portion of the oil release passage is broken, causing the torque limiter to be unusable. Consequently, in adjusting or assembling the torque limiter, the cylindrical member cannot be rotated freely relative to the shaft member, which imposes many limitations on adjustment or assemblage of the torque limiter, leading to a problem that neither smooth assemblage nor adjustment of the torque limiter can be implemented.

Patent Document 1: JP-UM-A-6-37609

Problem that the Invention is to Solve

Then, a problem that the invention is to solve is how to provide a torque limiter which can be assembled and adjusted easily and quickly.

Means for Solving the Problem

With a view to solving the problem, according to the invention, there is provided a torque limiter comprising:

a cylindrical member; and a shaft member which is fitted rotatably in the cylindrical member, the cylindrical member having a main body portion having in an interior thereof an oil pressure expansion chamber for pressing an inner circumferential surface of the cylindrical member against an outer circumferential surface of the shaft member and an oil release passage which is opened to the oil pressure expansion chamber at one end portion while being closed tightly at the other end portion and which is positioned further radially outwards than an outer circumferential surface of the main body portion, the shaft member having a circumferentially extended portion which is extended circumferentially a predetermined dimension so as to follow the outer circumferential surface of the main body portion of the cylindrical member, the circumferentially extended portion having a circumferentially extended groove which is opened radially inwards and is extended in the circumferential direction, a threaded hole which is opened radially outwards and to the circumferentially extended groove and which is extended radially and a cap member which is screwed in the threaded hole, characterized in that when the cylindrical member stays still relative to the shaft member, the other end portion of the oil release passage is accommodated within the cap member which is screwed to be fixed in the threaded hole, whereas when the cylindrical member rotates relative to the shaft member, the other end portion of the oil release passage is broken by the cap member, whereby the oil release passage is opened to the outside, and in that when the cylindrical member is rotated relative to the shaft member in such a state that the cap member is not screwed in the threaded hole and in such a state that the oil release passage is not opened to the outside, the other end portion of the oil release passage moves in the circumferential direction within the circumferentially extended groove while being spaced apart from the circumferentially extended groove.

The invention is the invention of the torque limiter in which the oil expansion chamber resides in the cylindrical member.

According to the invention, when the cylindrical member is rotated relative to the shaft member in such a state that the cap member is not screwed in the threaded hole and in such a state that the oil release passage is not opened to the outside, the other end portion of the oil release passage is made to move in the circumferential direction within the circumferentially extended groove while being spaced apart from the circumferentially extended groove. Because of this, in adjusting or assembling the torque limiter, only by removing the cap member, the cylindrical member is allowed to rotate freely relative to the shaft member. Then, at the end of the adjustment or assemblage, the relative position between the shaft member and the cylindrical member is adjusted so that the threaded hole and the other end portion of the oil release passage come to overlap radially, and thereafter, the oil pressure in the oil pressure expansion chamber is made to be a predetermined pressure for use when the torque limiter is in use. Thereafter, only by screwing the cap member in the threaded hole, the adjustment and assemblage can be implemented. Consequently, in adjusting or assembling the torque limiter, since the cylindrical member is allowed to rotate freely relative to the shaft member only by removing the cap member, the adjustment and assemblage of the torque limiter can be implemented easily and quickly.

In addition, according to the invention, there is provided a torque limiter comprising:
a shaft member; and
a cylindrical member which is fitted rotatably on the shaft member,
the shaft member having a main body portion having in an interior thereof an oil pressure expansion chamber for pressing an outer circumferential surface of the shaft member against an inner circumferential surface of the cylindrical member and an oil release passage which is opened to the oil pressure expansion chamber at one end portion while being closed tightly at the other end portion and which is positioned further axially outwards than an axial end face of the main body portion,
the cylindrical member having a circumferentially extended portion which faces axially the end face of the shaft member and which is extended circumferentially a predetermined dimension about a center axis,
the circumferentially extended portion having a circumferentially extended groove which is opened axially inwards and which is extended circumferentially, a threaded hole which is opened axially outwards and to the circumferentially extended groove and which is extended axially and a cap member which is screwed in the threaded hole, characterized in that
when the cylindrical member stays still relative to the shaft member, the other end portion of the oil release passage is accommodated within the cap member which is screwed to be fixed in the threaded hole, whereas when the cylindrical member rotates relative to the shaft member, the other end portion of the oil release passage is broken by the cap member, whereby the oil release passage is opened to the outside, and in that
when the cylindrical member is rotated relative to the shaft member in such a state that the cap member is not screwed in the threaded hole and in such a state that the oil release passage is not opened to the outside, the other end portion of the oil release passage moves in the circumferential direction within the circumferentially extended groove while being spaced apart from the circumferentially extended groove.

The invention is the invention of the torque limiter in which the oil expansion chamber resides in the shaft member.

According to the invention, when the cylindrical member is rotated relative to the shaft member in such a state that the cap member is not screwed in the threaded hole and in such a state that the oil release passage is not opened to the outside, the other end portion of the oil release passage is made to move in the circumferential direction within the circumferentially extended groove while being spaced apart from the circumferentially extended groove. Because of this, in adjusting or assembling the torque limiter, only by removing the cap member, the cylindrical member is allowed to rotate freely relative to the shaft member. Then, at the end of the adjustment or assemblage, the relative position between the shaft member and the cylindrical member is adjusted so that the threaded hole and the other end portion of the oil release passage come to overlap axially, and thereafter, the oil pressure in the oil pressure expansion circumferential surface of a cylindrical member of the cap member. the cap member in the threaded hole, the adjustment and assemblage can be implemented. Consequently, in adjusting or assembling the torque limiter, since the cylindrical member is allowed to rotate freely relative to the shaft member only by removing the cap member, the adjustment and assemblage of the torque limiter can be implemented easily and quickly.

Advantage of the Invention

According to the torque limiter, in adjusting or assembling the torque limiter, only by removing the cap member, the cylindrical member is allowed to rotate freely relative to the shaft member. Then, at the end of the adjustment or assemblage, the relative position between the shaft member and the cylindrical member is adjusted so that the threaded hole and the other end portion of the oil release passage come to overlap radially or axially, and thereafter, the oil pressure in the oil pressure expansion chamber is made to be a predetermined pressure in use. Thereafter, only by screwing the cap member in the threaded hole, the adjustment and assemblage can be implemented. Consequently, in adjusting or assembling the torque limiter, since the cylindrical member is allowed to rotate freely relative to the shaft member only by removing the cap member, the adjustment and assemblage of the torque limiter can be implemented easily and quickly.

BEST MODE FOR CARRYING OUT THE INVENTION

Figure 1:
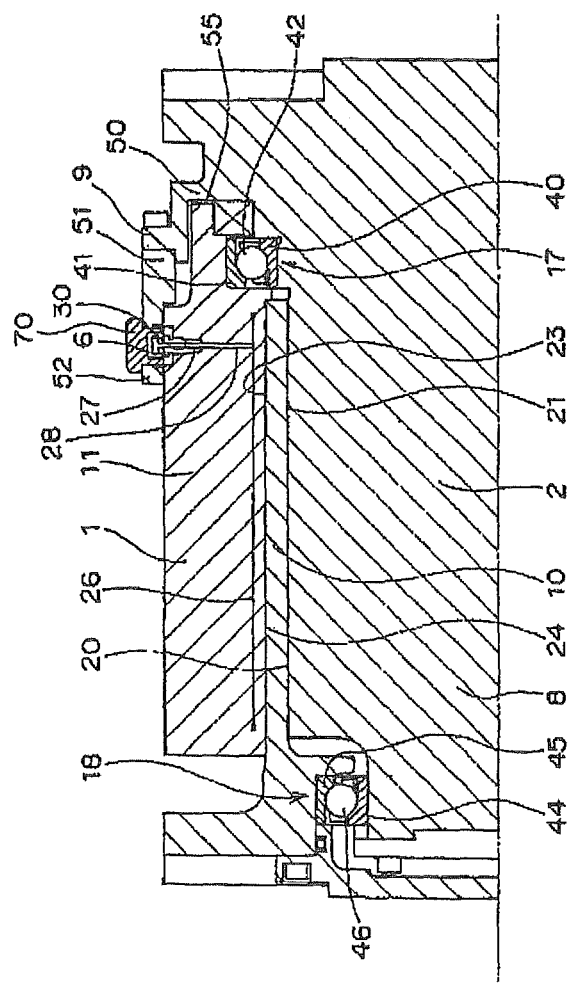
[FIG. 1] An axial sectional view of a torque limiter of a first embodiment of the invention.

The invention will be described in greater detail based on embodiments illustrated in the drawings.

FIG. 1 is an axial sectional view of a torque limiter of a first embodiment of the invention.

This torque limiter includes a cylindrical member 1, a shaft member 2, a ball bearing 17 and a ball bearing 18.

The cylindrical member 1 is made up of a primary cylindrical member 10 and a secondary cylindrical member 11. The primary cylindrical member 10 has a substantially cylindrical inner circumferential surface 21 which abuts with an outer circumferential surface 20 of the shaft member 2. A seizing preventive lubricant (traction oil or turbine oil) exists between the outer circumferential surface 20 of the shaft member 20 and the inner circumferential surface 21 of the primary cylindrical member 10. The secondary cylindrical portion 11 has a substantially cylindrical inner surface 24 which abuts with an a substantially cylindrical outer circumferential surface 23 of the primary cylindrical member 10. The secondary cylindrical member 11 has a plurality of shear valve mounting holes 30 and an annular oil pressure expansion chamber 26 which extends axially over a predetermined length on the inner circumferential surface 24 of the secondary cylindrical member 11 in a substantially axial direction of the shaft member 2, and the plurality of shear valve mounting holes 30 are disposed circumferentially at equal intervals. The other end, which is radially outward, of an oil release bore 28 is opened to the shear valve mounting hole 30, and a radially inward one end of the oil release bore 28 communicates with the oil pressure expansion chamber 26.

In addition, the cylindrical member 1 has a number of shear valves 6 which is the same as the number of shear valves holes 30. Each shear valve 6 is fitted in the shear valve mounting hole 30. Each of the shear valves 6 has a tube 27, and the tube 27 extends in a radial direction of the shaft member 2 in such a state that the shear valve 6 is fitted in the shear valve mounting hole 30. In such a state that the shear valve 6 is fitted in the shear valve mounting hole 30, one end portion, which is radially inward, of the tube 27 communicates with the other end of the oil release bore 28 and hence communicates with an axial end side of the oil pressure expansion chamber 26. On the other hand, the other end portion, which is radially outward, of the tube 27 projects further radially outwards than the outer circumferential surface of the secondary cylindrical member 11. The other end portion or radially outward end portion of the tube 27 is closed tightly. The primary cylindrical member 10 and the secondary cylindrical member 11 make up a main body portion of the cylindrical member 1, and the tube 27 and the oil release bore 28 make up an oil release passage.

The shaft member 2 has a main body portion 8 which has the substantially cylindrical outer circumferential surface 20 and a locking portion 9 having a substantially L-shaped section and which projects from an outer surface of the main body portion 8.

The locking portion 9 has a radially extended portion 50, an axially extended portion 51 and a circumferentially extended portion 52. The radially extended portion 50 faces axially an axial end face 55 of the cylindrical member 1 and is extended radially. The axially extended portion 51 connects to the radially extended portion 50 and is extended axially along the outer circumferential surface of the cylindrical member 1. In addition, the circumferentially extended portion 52 connects axially to the axially extended portion 51.

The ball bearing 17 has an inner ring 40 which is fitted on the outer circumferential surface of the shaft member 2 so as to be fixed thereto, an outer ring 41 which is fitted in the inner circumferential surface of the secondary cylindrical member 11 so as to be fixed thereto, and a plurality of balls 42 which are disposed between a raceway surface of the inner ring 40 and a raceway surface of the outer ring 41. In addition, the ball bearing 18 has an inner ring 44 which is fitted on an outer circumferential surface of the shaft member 2 so as to be fixed thereto, an outer ring 45 which is fitted in the inner circumferential surface of the primary cylindrical member 10 so as to be fixed thereto, and a plurality of balls 46 which are disposed between a raceway surface of the inner ring 44 and a raceway surface of the outer ring 45. The ball bearing 17 and the ball bearing 18 are designed to support rotatably the shaft member 2 relative to the cylindrical member 1 when the shaft member 2 rotates relative to the cylindrical member 1.

Figure 2:
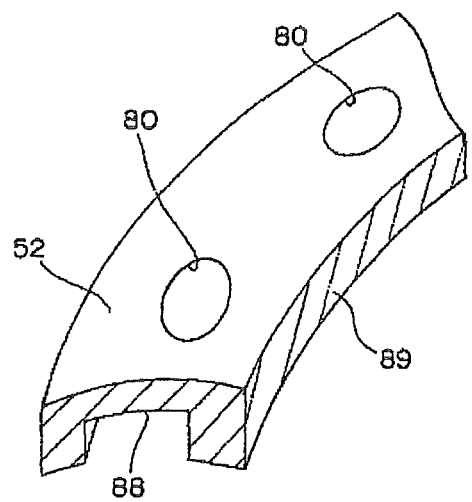
[FIG. 2] A perspective view showing exemplarily part of a circumferentially extended portion of a locking portion of a shaft member in the torque limiter of the first embodiment.

FIG. 2 is a perspective view showing exemplarily part of the circumferentially extended portion 52 of the locking portion 9 of the shaft member 2. Note that in FIG. 2, the axially extended portion 51 (refer to FIG. 1), which is not shown, is connected to a plane denoted by 89 in a position lying within a circumferential predetermined range.

The circumferentially extended portion 52 has an annular shape and is extended circumferentially along the full circumference (to represent this in a unit of circular measure, $2\pi$ radians as an example of a predetermined distance) of the outer circumferential surface of the cylindrical member 1 so as to follow the same.

As is shown in FIG. 2, the circumferentially extended portion 52 has a circumferentially extended groove 88 and a plurality threaded holes 80. The circumferentially extended groove 88 is opened radially inwards. The circumferentially extended groove 88 is extended circumferentially along the full circumference of the circumferentially extended portion 52.

On the other hand, the plurality of threaded holes 80 are disposed circumferentially at equal intervals. The number of threaded holes 80 is made equal to the number of shear vale mounting holes 30. The threaded hole 80 is extended radially. Each of the threaded holes 80 is opened radially outwards and is extended radially inwards to be opened to the circumferentially extended groove 88. An internal thread is formed in each threaded hole 80.

Figure 3:
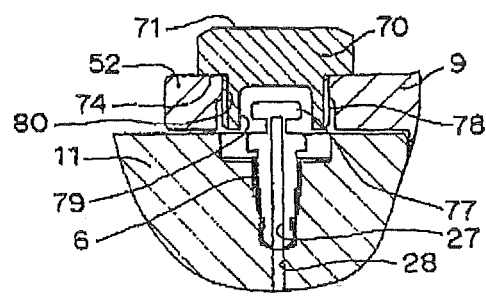
[FIG. 3] An axially enlarged sectional view of the periphery of a shear valve including a center axis of a threaded hole when power is transmitted between a cylindrical member and a shaft member with the torque limiter in use.

FIG. 3 is an axially enlarged sectional view of the periphery of a shear valve 6 including a center axis of the threaded hole 80 when power is being transmitted between the cylindrical member 1 and the shaft member 2 with the torque limiter in use.

As is shown in FIG. 3, with the torque limiter in use, the threaded hole 80 and the shear valve 6 radially overlap each other. A cap member 70 is screwed in the threaded hole 80. The cap member 70 has a head portion 71 and a cylindrical portion 78, which is substantially cylindrical, and the cylindrical portion 78 is extended from a lower surface 74 of the head portion 70 in a substantially normal direction of the lower surface 74. The cylindrical portion 78 has an outer circumferential surface on which a male thread is tapped. The cap member 70 is screwed into the threaded hole 80 radially inwards of the shaft member 2 until a lower surface of the head portion 71 is brought into abutment with an outer circumferential surface of the circumferentially extended portion.

As is shown in FIG. 3, in the shear valve 6, a portion positioned further radially outwards than the outer circumferential surface of the secondary cylindrical member 11 is accommodated in an interior of the cylindrical portion 78 of the cap member 70.

Figure 4:
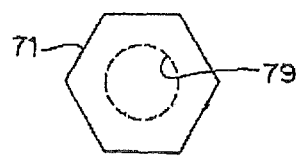
[FIG. 4] A view of a cap member of the torque limiter of the first embodiment when viewed from a head portion side thereof.

FIG. 4 is a view of the cap member 70 as viewed from the head portion 78 side. Note that in FIG. 4, a dotted line 79 denotes an inner circumferential surface of the cylindrical portion (refer to FIG. 3) of the cap member 70.

As is shown in FIG. 4, the head portion 71 of the cap member 70 has a regular hexagonal section. A diameter of a circumscribed circle of the head portion is made larger than a diameter of a circumscribed circle of the cylindrical portion.

In the aforesaid configuration, in this torque limiter, in such a state that a relative position between the cylindrical member 1 and the shaft member 2 takes a relative position when the torque limiter is in use, in such a state that the cap member 70 is not screwed in the threaded hole 80 and in such a state that the tube 27, functioning as the oil release passage, is not opened to the outside, when the cylindrical member is rotated relative to the shaft member 2, the other end portion or radially outward end portion of the tube 27 is made to move circumferentially within the circumferentially extended groove 88 in such a state that the other end portion is spaced apart from the circumferentially extended groove 88.

In addition, with the torque limiter in use, in the event that a load of a predetermined value or smaller (a load within a range where torque transmission is performed) is exerted on either the cylindrical member 1 or the shaft member 2, the inner circumferential surface 21 of the primary cylindrical member 10 is reduced in diameter by an oil pressure expanding oil that is injected into the oil pressure expansion chamber 26 so as to press the inner surface 21 against the outer circumferential surface 20 of the secondary member 2, so that the shaft member 2 and the cylindrical member I are brought into frictional connection with each other for transmission of torque between the shaft member 2 and the cylindrical member 1.

On the other hand, when a load at the predetermined value or more (a load larger than the load falling within the range where torque transmission is performed) is exerted on either the cylindrical member 1 or the shaft member 2 and the outer circumferential surface 20 of the shaft member 2 slips on the inner circumferential surface 21 of the primary cylindrical member, changing the positions of the cylindrical member 1 and the shaft member 2 about an axis, the cap member 70 breaks a radially outward end portion of the shear valve 6 and the radially outward end portion or the other end portion of the tube 27, so that the oil pressure expanding oil in the oil pressure expansion chamber 26 is allowed to be discharged to the outside via the tube 27 of which the other end portion is broken and the oil release bore 28. In this way, the pressing force exerted by the inner circumferential surface 21 of the primary cylindrical member 10 on the outer circumferential surface of the shaft member 2 is eliminated, so as to release the frictional connection between the cylindrical member 1 and the shaft member 2, whereby the transmission of torque therebetween is cut off. In this way, in the event that an excessive load is generated on either the cylindrical member 1 or the shaft member 2, the transmission of torque is cut off so as to protect an expensive machine coupled to a torque limiter apparatus.

In addition, as is shown in FIG. 3, the radially outward end portion of the shear valve 6 is formed into a head portion having a substantially rectangular section. In such a state that the cap member 70 is fixed in a predetermined position in the threaded hole 80, the head portion 77 is positioned further radially outwards than a radially innermost position of the cap member 70 and further inwards than an inner circumferential surface of the cylindrical portion 78 and is designed to be broken by the cap member 70 when the transmission of torque is cut off.

Here, the head portion 77 is formed so as not to be caught (so as not to bite into) between the cap member 70 and the secondary cylindrical member 11. In this way, the failure of relative rotation between the cylindrical member 1 and the shaft member 2 is prevented which would otherwise be caused by the broken head portion 77 being caused to bite into between the cap member 70 and the secondary cylindrical member 11 when the shaft member 2 rotates relative to the cylindrical member 1. In addition, the inner circumferential surface 79 (refer to FIG. 3) of the cylindrical portion 78 is formed into a smooth surface which is free from irregularities. In this way, the broken head portion 77 is prevented from being caused on the inner circumferential surface 79 of the cylindrical portion 78, whereby the risk of the broken head portion 77 being caused to bite into between the cap member 70 and the secondary cylindrical member 11 is prevented completely.

According to the torque limiter of the first embodiment, when the cylindrical member 1 is rotated relative to the shaft member 2 in such a state that the cap member 70 is not screwed into the threaded hole 80 and in such a state that the tube 27 which constitutes the oil release passage is not opened to the outside, since the other end portion or the radially outward end portion of the tube 27 is made to move circumferentially within the circumferentially extended groove 88 while being spaced apart from the circumferentially extended groove 88, in adjusting or assembling the torque limiter, the cylindrical member 1 is allowed to rotate freely relative to the shaft member 2 only by removing the cap member 70. At the end of the adjustment or assemblage of the torque limiter, the relative position between the shaft member 2 and the cylindrical member 1 is adjusted so that the threaded hole 80 and the other end portion of the tube radially overlap each other. Thereafter, the oil pressure in the oil pressure expansion chamber is made to be a predetermined oil pressure for use when the torque limiter is in use, and the cylindrical member 1 and the shaft member 2 are brought into frictional connection with each other. Thereafter, only by screwing the cap member 70 into the threaded hole 80, the adjustment and assemblage of the torque limiter can be implemented. Consequently, in adjusting or assembling the torque limiter, since the cylindrical member 1 can be rotated freely relative to the shaft member 2 only by removing the cap member 70, the adjustment and assemblage of the torque limiter can be implemented easily and quickly.

In the first embodiment, while the cylindrical member 1 is described as being made up of the primary cylindrical member 10 having the inner circumferential surface 21 which is brought into contact with the outer circumferential surface 20 of the shaft member 20 and the secondary cylindrical member 11 having the oil pressure expansion chamber 26 in which the oil pressure expanding oil is sealed, in this invention, the cylindrical member may be an integral cylindrical member having an inner circumferential surface which is brought into contact with the outer circumferential surface of the shaft member and an oil pressure expansion chamber in which oil pressure expanding oil is sealed.

In addition, in the torque limiter of the first embodiment, while the circumferentially extended portion 52 is described as being connected to the radially extended portion 50 via the axially extended portion 51, in this invention, with the axially extended portion omitted, the circumferentially extended portion may be connected directly to the radially extended portion.

Additionally, in the torque limiter of the first embodiment, while the circumferentially extended portion 52 is described as having the annular shape, in this invention, the circumferentially extended portion does not have to have the annular shape, and the circumferentially extended portion may only have to be extended circumferentially a predetermined distance (to represent this in a unit of circular measure, a distance smaller than $2\pi$ radians). In addition, as this occurs, a member which rotates together with the shaft member is not preferably provided in a space resulting when the circumferentially extended groove is extended circumferentially about the center axis of the cylindrical member.

In addition, in the torque limiter of the first embodiment, while the circumferentially extended portion 52 is described as having the plurality of threaded holes 80 and the threaded holes 80 are described as being disposed circumferentially at equal intervals, in the invention, the circumferentially extended portion may have a plurality of threaded holes, and the threaded holes may be disposed circumferential at unequal intervals. In addition; in this invention, there may be provided only one threaded hole, and also, there may be provided only one shear valve mounting hole, one oil release bore and one shear valve.

In addition, in the torque limiter of the first embodiment, while the cap member 70 is described as having the head portion having the regular hexagonal section, in this invention, the head portion of the cap member may have any sectional shape provided that it has a lower surface which is brought into abutment with the outer surface of the circumferentially extended portion.

Figure 5:
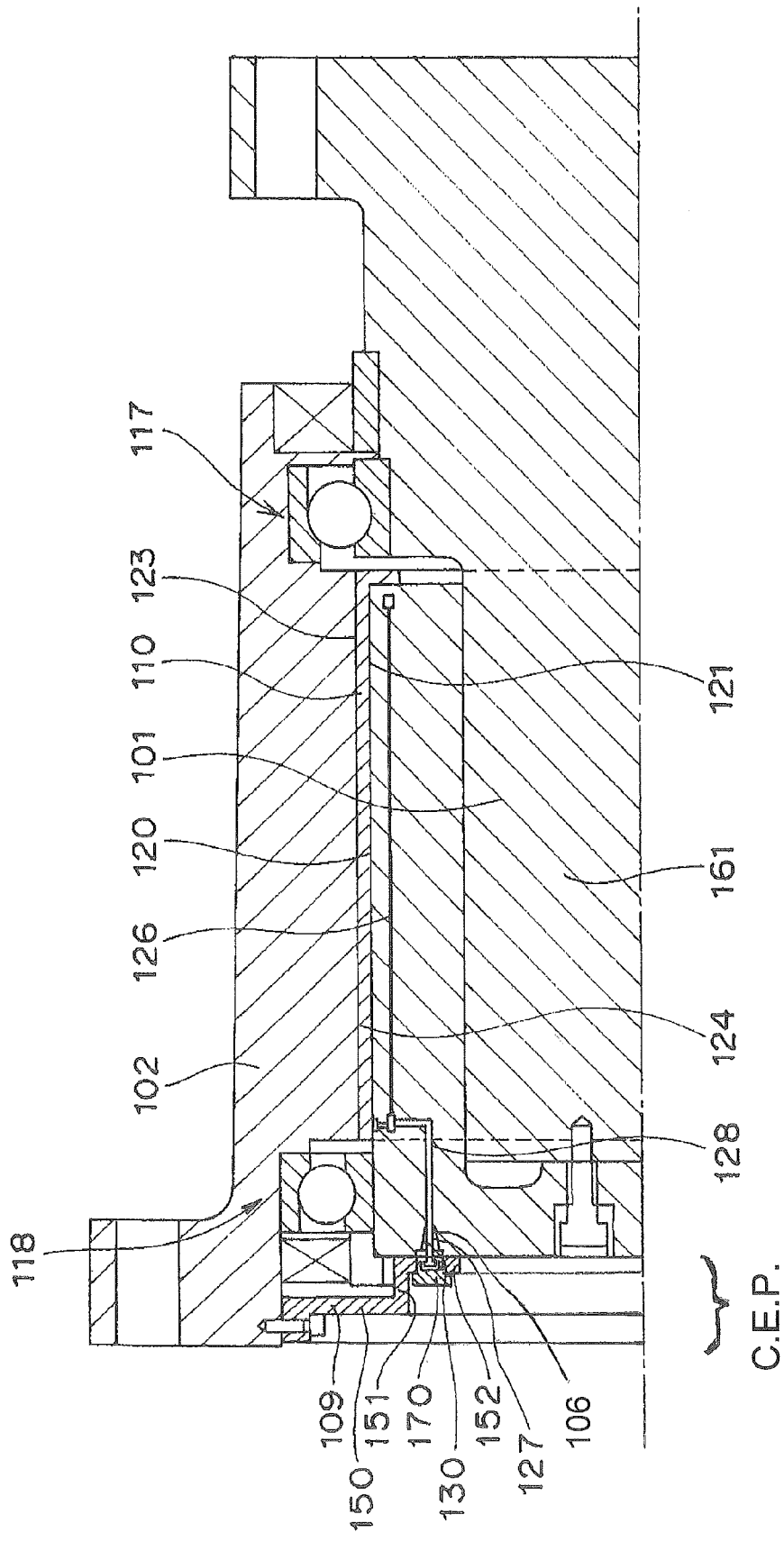
[FIG. 5] An axial sectional view of a torque limiter of a second embodiment of the invention.

FIG. 5 is an axial sectional view of a torque limiter of a second embodiment of the invention.

Note that in a torque limiter of the second embodiment, the description of configurations, functions and advantages, and modified examples which are common to those of the first embodiment will be omitted.

The torque limiter of the second embodiment has an axial member (e.g., shaft member 101), a cylindrical member 102, a ball bearing 117 and a ball bearing 118, and the shaft member 101 has a shear valve 106.

The shaft member 101 has a shaft main body 161 having a substantially cylindrical outer circumferential surface 120 and an annular member 110. An inner circumferential surface 121 of the annular member 110 is fitted on the outer circumferential surface 120 of the shaft main body 161. As is shown in FIG. 5, the annular member 110 has an L-shaped section. The annular member 110 has a portion which is brought into abutment with an axial end face of the shaft main body 161 and which is extended radially. The annular member 110 has a substantially cylindrical outer circumferential surface 123.

The cylindrical member 102 has a locking portion 109 which projects from an outer surface of the cylindrical member 102 and has a substantially cylindrical inner surface 124. The inner circumferential surface 124 of the cylindrical member 102 is designed to be brought into frictional connection with the outer circumferential surface 123 of the shaft member 101 (specifically speaking, the annular member 110) when torque is transmitted. As with the first embodiment, traction oil or turbine oil which is seizing preventive lubricant exists between the outer circumferential surface 123 of the shaft member 101 and the inner circumferential surface 124 of the cylindrical member 102.

The shaft main body 161 has a shear valve mounting hole 130 and an annular oil pressure expansion chamber 126 which extends axially over a predetermined length on the outer circumferential surface 123 of the annular member 110 in a substantially axial direction of the shaft member 101.

The shear valve 106 is fitted in the shear valve mounting hole 130. One end portion of the shear valve 106 projects further axially outwards than the axial end face of the shaft main body in such a state that the shear valve 106 is fitted in the shear valve mounting hole 130. In addition, the locking portion 109 extends radially along the axial end face of the shaft main body 161.

The shear valve 106 has a tube 127 which is opened at one end only. This tube 127 communicates with an oil release bore 128 in such a state that the shear valve 106 is fitted in the shear vale mounting hole 130. One end portion of the tube 127 projects further axially outwards than the axial end face of the shaft main body 161 in such a state that the shear valve 106 is fitted in the shear valve mounting hole 130. The one end portion of the tube 127 is sealed (closed) tightly. In addition, an opening of the tube 127 which lies on an opposite side to the closed side communicates with one end of the oil release bore 128, and the other end of the oil release bore 128 communicates with one end side of the oil pressure expansion chamber 126. By adopting this configuration, a shear valve 106 side of the oil pressure expansion chamber 126 is formed into a sealed space.

The ball bearing 117 has an inner ring which is fitted on an outer circumferential surface of the shaft main body 161 to be fixed thereto, an outer ring which is fitted in the inner circumferential surface of the cylindrical member 102 to be fixed thereto and a plurality of balls which are disposed between a raceway surface of the inner ring and a raceway surface of the outer ring. In addition, the ball bearing 118 has an inner ring which is fitted on the outer circumferential surface of the shaft main body 161 to be fixed thereto, an outer ring which is fitted in the inner circumferential surface of the cylindrical member 102 to be fixed thereto and a plurality of balls which are disposed between a raceway surface of the inner ring and a raceway surface of the outer ring. The ball bearing 117 and the ball bearing 118 are designed to support rotatably the shaft member 101 relative to the cylindrical member 102 when the shaft member 101 rotates relative to the cylindrical member 102.

This torque limiter is configured so that by the oil pressure expansion chamber 126 being expanded radially, the outer circumferential surface 123 of the shaft member 101 is brought into frictional engagement with the inner circumferential surface 124 of the cylindrical member 102.

Figure 7:
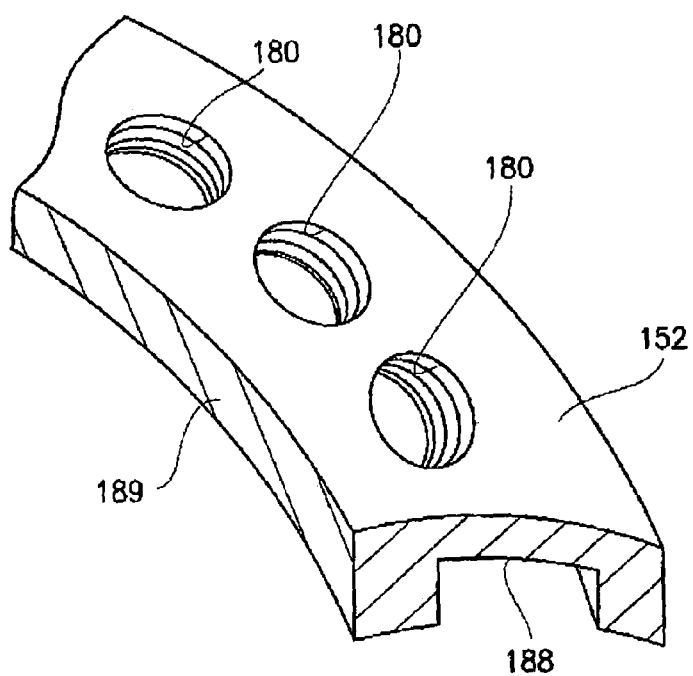
[FIG. 7] A cut-away portion of circumferentially extended portion 152.

The locking portion 109 of the cylindrical member 102 has a radially extended portion 150 which is extended radially along the end face of the shaft main body 161, and the radially extended portion 150 connects to an annular circumferentially extended portion (C.E.P. shown in FIG. 5) 152 via an axially extended portion 151. The circumferentially extended portion 152 is extended circumferentially about a center axis of the shaft member 101 and faces axially the axial end face of the shaft main body 161. The circumferentially extended portion 152 has an annular circumferentially extended groove 188, as shown in FIG. 7, which is opened axially inwards (towards the shaft main body 161 side) and has a plurality of threaded holes which are opened axially outwards and are opened to the circumferentially extended groove. The plurality of threaded holes are disposed circumferentially at predetermined intervals. In addition, when in use, cap members 170 are screwed into the threaded holes to be fixed therein.

The cap member 170 has the same shape as that of the cap 70 in the first embodiment, and a modified example to the first embodiment can also be adopted. In addition, the tube 127 has the same shape to that of the tube 27 in the first embodiment, and a modified example to the first embodiment can also be adopted. when in use, a head portion of the tube 127 is positioned further axially outwards than an axially innermost (towards the shaft main body 161 side of the cap member 170 and further inwards than an inner circumferential surface of a cylindrical portion of the cap member 170 in such a state that the cap member 170 is fixed in a predetermined position in the threaded hole, and when cutting off the transmission of torque, the head portion of the tube 127 is designed to be broken by the cap member 170.

In the configuration described above, in this torque limiter, when the cylindrical member 102 is rotated relative to the shaft member 101 in such a state that the relative position between the cylindrical member 102 and the shaft member 101 is made to be a relative position for use when the torque limiter is in use, in such a state that the cap member 170 is not screwed in the threaded hole, and in such a state that the tube 127 which constitutes the oil release passage is not opened to the outside, an axially outward end portion of the tube 127 is designed to move circumferentially in the circumferentially extended groove while being spaced apart from the circumferentially extended groove.

In addition, with the torque limiter in use, in the event that a load of a predetermined value or smaller (a load within a range where torque transmission is performed) is exerted on either the cylindrical member 102 or the shaft member 101, the outer circumferential surface 123 of the shaft member 101 is increased in diameter by an oil pressure expanding oil that is injected into the oil pressure expansion chamber 126 so as to press the outer surface 123 against the inner circumferential surface 124 of the cylindrical member 102, so that the shaft member 101 and the cylindrical member 102 are brought into frictional connection with each other for transmission of torque between the shaft member 101 and the cylindrical member 102.

On the other hand, when a load at the predetermined value or more (a load larger than the load falling within the range where torque transmission is performed) is exerted on either the cylindrical member 102 or the shaft member 101 and the outer circumferential surface 123 of the shaft member 101 slips on the inner circumferential surface 124 of the cylindrical member 102, changing the positions of the cylindrical member 102 and the shaft member 101 about an axis, the cap member 170 breaks an axially outward end portion of the shear valve 106 and the axially outward end portion of the tube 127, so that the oil in the oil pressure expansion chamber 126 is allowed to be discharged to the outside via the tube 127 of which the axially outward end portion is broken. In this way, the pressing force exerted by the outer circumferential surface 123 of the shaft member 101 on the inner circumferential surface 124 of the cylindrical member 102 is eliminated, so as to release the frictional connection between the cylindrical member 102 and the shaft member 101, whereby the transmission of torque therebetween is cut off. In this way, in the event that an excessive load is generated on either the cylindrical member 102 or the shaft member 101, the transmission of torque is cut off so as to protect an expensive machine coupled to a torque limiter apparatus.

According to the torque limiter of the second embodiment, when the cylindrical member 102 is rotated relative to the shaft member 101 in such a state that the cap member 170 is not screwed into the threaded hole and in such a state that the tube 127 is not opened to the outside, since the axially outward end portion of the tube 127 is made to move circumferentially within the circumferentially extended groove while being spaced apart from the circumferentially extended groove, in adjusting or assembling the torque limiter, the cylindrical member 102 is allowed to rotate freely relative to the shaft member 101 only by removing the cap member 170. At the end of the adjustment or assemblage of the torque limiter, the relative position between the shaft member 101 and the cylindrical member 102 is adjusted so that the threaded hole and the end portion of the tube 127 axially overlap each other. Thereafter, the oil pressure in the oil pressure expansion chamber 126 is made to be a predetermined oil pressure for use when the torque limiter is in use, and the cylindrical member 101 and the shaft member 102 are brought into frictional connection with each other. Thereafter, only by screwing the cap member 170 into the threaded hole, the adjustment and assemblage of the torque limiter can be implemented. Consequently, in adjusting or assembling the torque limiter, since the cylindrical member 102 can be rotated freely relative to the shaft member 101 only by removing the cap member 170, the adjustment and assemblage of the torque limiter can be implemented easily and quickly.

Figure 6:
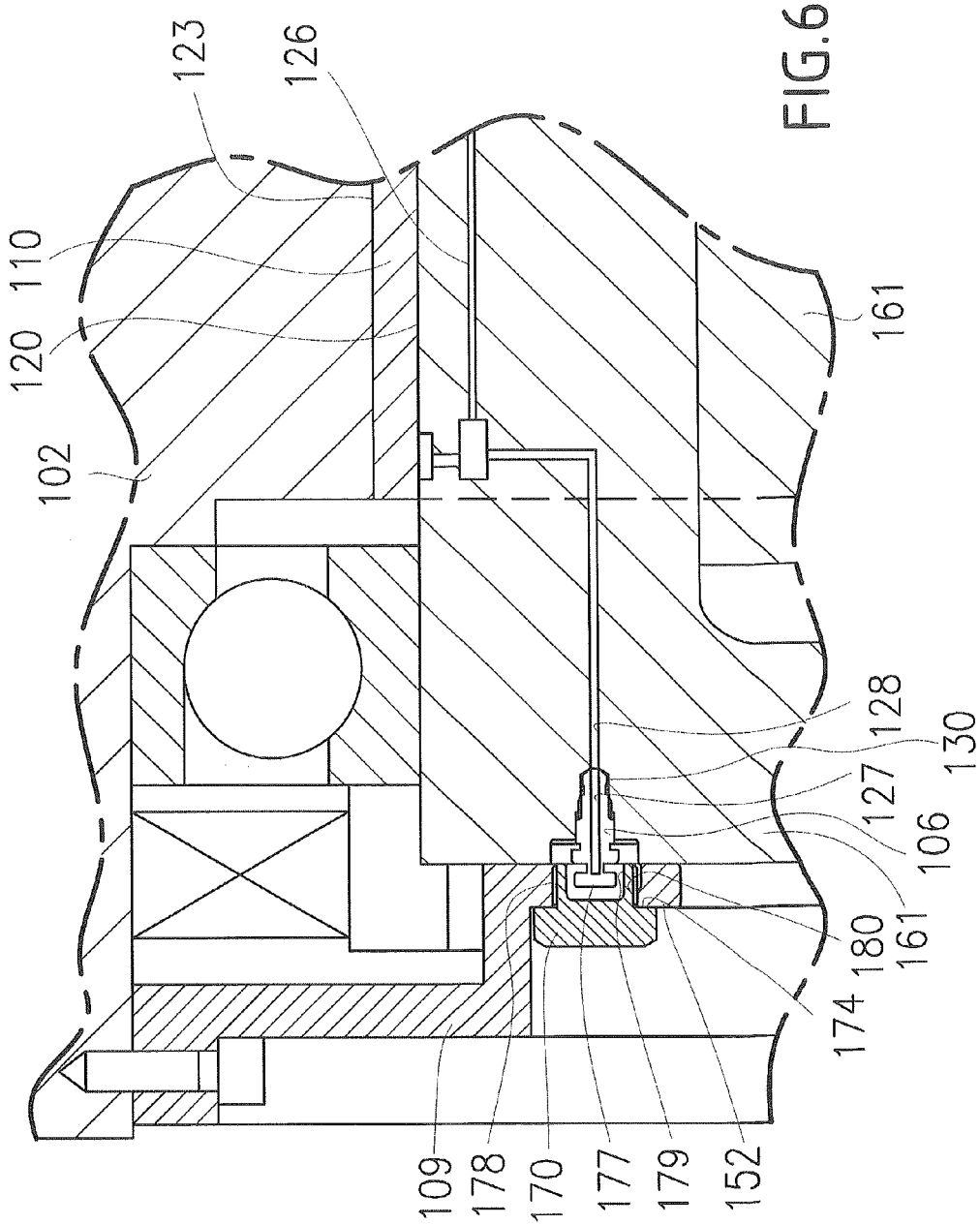
[FIG. 6] An enlarged view of a portion of FIG 5.
Figure 8:
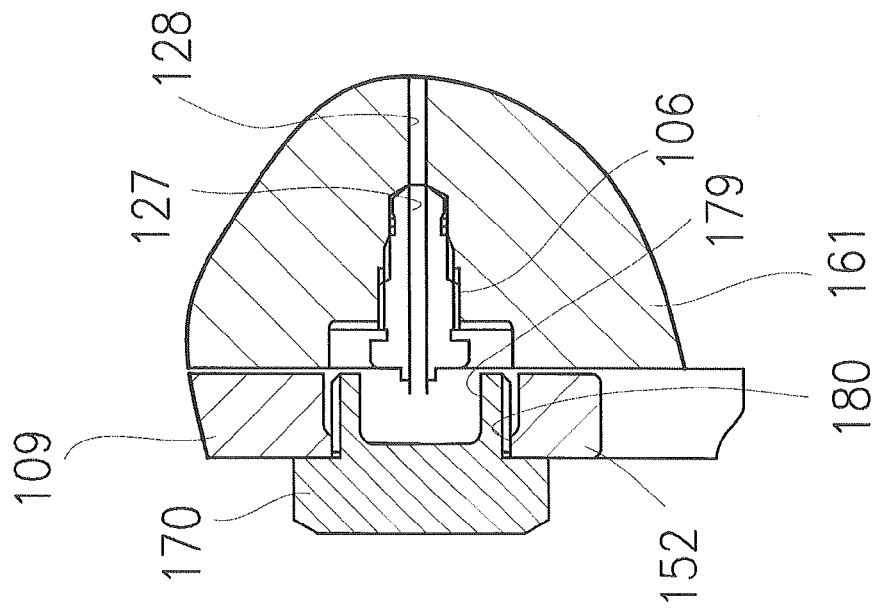
[FIG. 8] A portion of an exemplary embodiment having the cap 170 removed.
Figure 9:
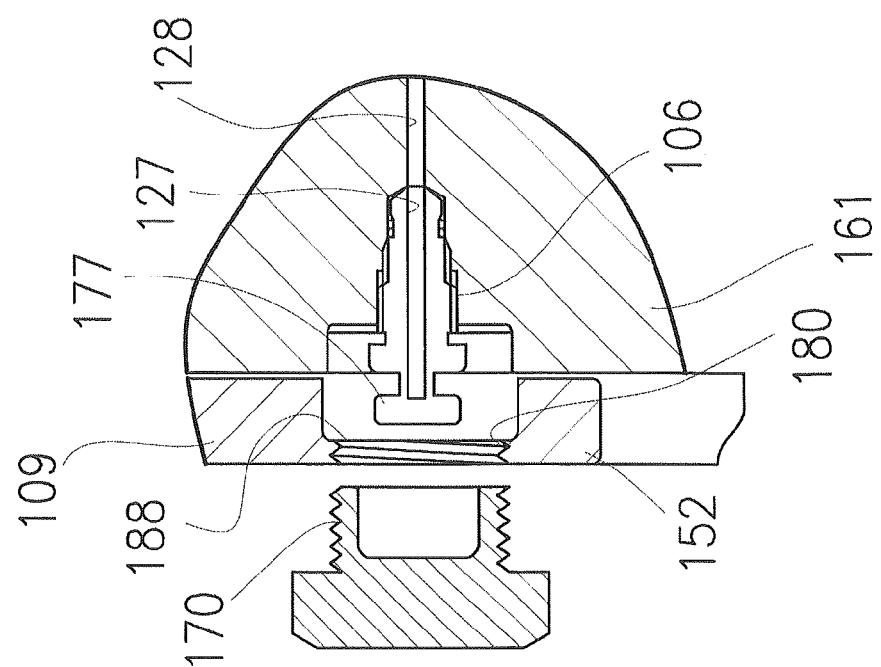
[FIG. 9] A portion of an exemplary embodiment where head portion 177 has been sheared off.

FIGS. 6-9 illustrate details of portions of the second exemplary embodiment. FIG. 6 is an enlarged portion of exemplary FIG. 5. In FIG. 6, exemplary embodiments of cylindrical portion 178 of the cap member 170, head portion 177 of shear valve 106, inner circumferential surface 179 of the cylindrical portion 178, lower surface 174 of the head portion 177, threaded hole 180, tube 127, and circumferentially extended groove 188, are illustrated. FIG. 7 illustrates a portion of circumferentially extended portion 152, where axially extended portion 151, which is not shown, is connected to a plane denoted by 189. FIG. 8 illustrates cap member 170 in a removed state. FIG. 9 illustrates a state where head portion 177 has been sheared off so as to open tube 127 to the outside.

Further, it may, of course, be possible to adopt a configuration in which the shear valve mounting hole which communicates with the oil release bore of the torque limiter of the first embodiment is formed in an end face of a cylindrical member, the circumferentially extended portion of the second embodiment is mounted on a shaft member, and the shear valve is mounted in the shear valve mounting hole so that a head portion of the shear valve is positioned further axially outwards than an axially innermost (towards the cylindrical member side) position of a cap member which is mounted on the circumferentially extended portion and further inwards than an inner circumferential surface of a cylindrical member of the cap member.

The invention claimed is:

1. A torque limiter comprising:
a shaft member; and
a cylindrical member which is fitted rotatably on the shaft member,
the shaft member including:
  a main body portion having in an interior thereof an oil pressure expansion chamber for pressing an outer circumferential surface of the shaft member against an inner circumferential surface of the cylindrical member; and
  an oil release passage which is opened to the oil pressure expansion chamber at one end portion and which is closed at the other end portion that is positioned further axially outwards than an axial end face of the main body portion, the oil release passage including:
    a tube which is extended axially in the shaft member; and
    an oil release bore which is communicated with the tube and which is disposed between the tube and the oil pressure expansion chamber;
the cylindrical member including a circumferentially extended portion which faces axially the axial end face of the main body portion of the shaft member and which is extended circumferentially a predetermined dimension about a center axis of the shaft member, the circumferentially extended portion including:
  a circumferentially extended groove which is formed in an inner surface of the circumferentially extended portion and which is extended circumferentially; and
  a threaded hole which is opened axially outwards and is opened to the circumferentially extended groove and which is extended axially; and
a cap member which is screwed in the threaded hole,
wherein the cap member is adapted such that, when the cylindrical member stays still relative to the shaft member, the other end portion of the oil release passage is accommodated within the cap member which is screwed to be fixed in the threaded hole, such that when the cylindrical member rotates relative to the shaft member, the other end portion of the oil release passage is broken by the cap member, whereby the oil release passage is opened to the outside; and
wherein the circumferentially extending groove is adapted such that, when the cylindrical member is rotated relative to the shaft member in such a state that the cap member is not screwed in the threaded hole and in such a state that the oil release passage is not opened to the outside, the other end portion of the oil release passage circumferentially moves within the circumferentially extended groove while being spaced apart from the circumferentially extended groove.

2. The torque limiter according to claim 1, wherein the cylindrical member includes a locking portion, which projects from an outer surface of the cylindrical member, and a substantially cylindrical inner surface, and the locking portion of the cylindrical member includes a radially extended portion which is extended radially along the end face of the main body portion of the shaft member, and the radially extended portion connects to an annular circumferentially extended portion via an axially extended portion, the circumferentially extended portion is extended circumferentially about a center axis of the shaft member and faces axially the end face of the main body portion of the shaft member.

3. The torque limiter according to claim 1, wherein the threaded hole comprises a plurality of threaded holes disposed circumferentially at equal intervals.

4. The torque limiter according to claim 1, wherein the cap member includes a head portion and a cylindrical portion which is substantially cylindrical and extended from a lower surface of the head portion, and wherein the cylindrical portion includes an outer circumferential surface on which a male thread is tapped and the male thread is screwed into the threaded hole such that at least a portion of the oil release passage is accommodated within the cap member.

5. A torque limiter according to claim 4, wherein the head portion is positioned axially outwards with respect to the cylindrical portion of the cap member.

6. A torque limiter according to claim 4, further comprising:

a shear valve, the oil release passage being accommodated in the shear valve.

7. A torque limiter according to claim 1, wherein the other end portion of the oil release passage is spaced apart, in an axial direction of the threaded hole, from the circumferentially extended groove.

8. A torque limiter according to claim 1, wherein the circumferentially extended groove extends around an entire circumference of the circumferentially extended portion.

* * * * *